May 24, 1938.    O. MADER    2,118,317
MACHINING OF ENGINE CYLINDER LINERS
Original Filed April 15, 1935
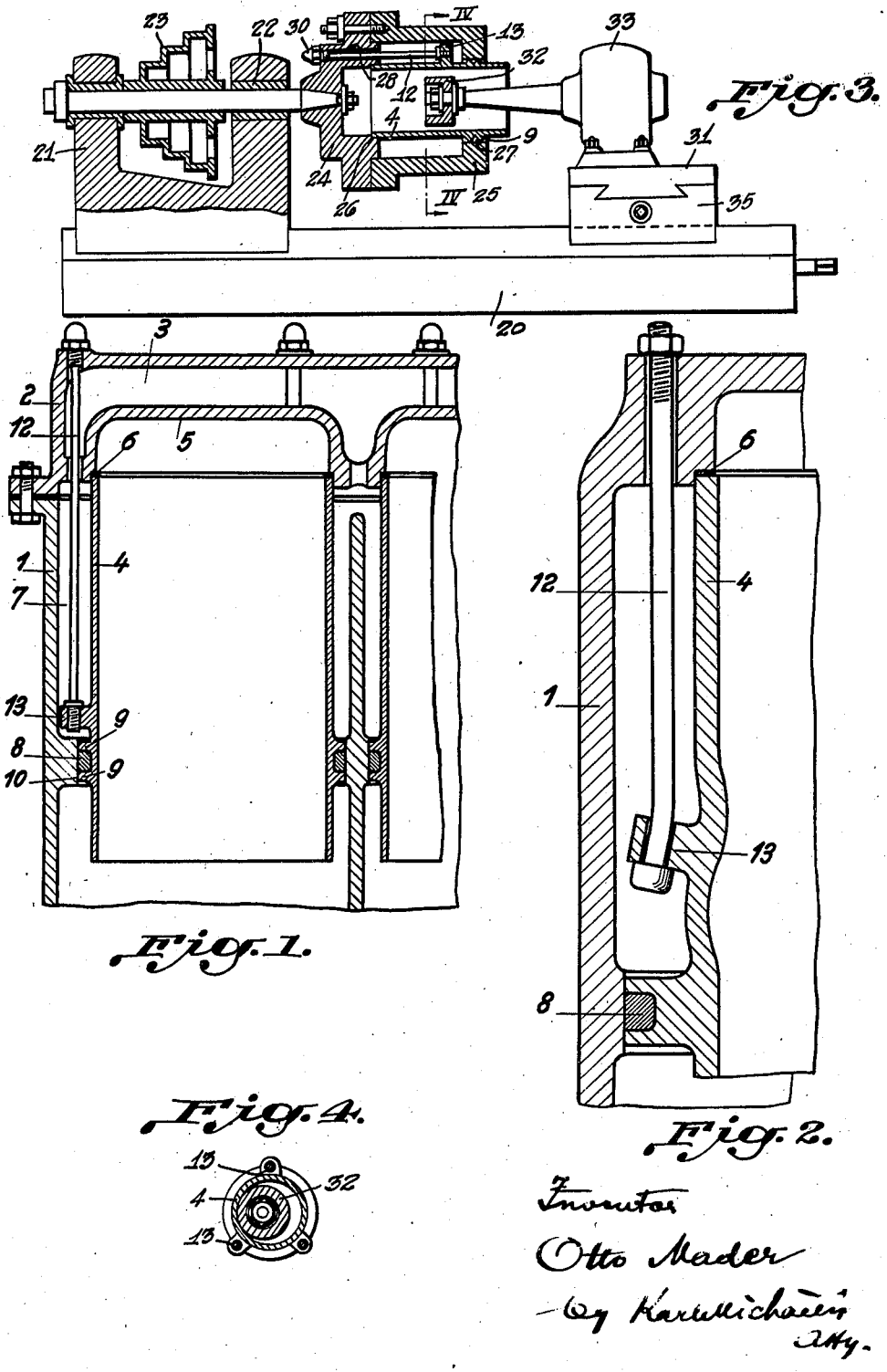

Patented May 24, 1938

2,118,317

UNITED STATES PATENT OFFICE 2,118,317

MACHINING OF ENGINE CYLINDER LINERS

Otto Mader, Dessau-Ziebigk, Germany, assignor to Junkers-Flugzeug- und Motorenwerke, Aktiengesellschaft, Dessau, Germany Original application April 15, 1935, Serial No. 16,415. Divided and this application December 16, 1935, Serial No. 54,546. In Germany April 23, 1934.

1 Claim. (Cl. 29—156.4)

My invention relates to internal combustion engines, more especially of the kind in which liners are provided in the cylinders. It has particular reference to a combination of cylinders and liners such as described in my copending application for patent of the United States filed April 15, 1935, Serial No. 16,415, of which the present application is a division.

In my copending application I have described the combination, with the cylinders of internal combustion engines, of liners, which are separated from the cylinder body proper, which may have the form of a water jacket, and are water-cooled. In this kind of engines the liners do not participate in the transmission of the gas pressures in axial direction, being formed, throughout the area of the highest combustion pressures and temperatures, with walls, the thickness of which merely suffices to reliably take up the gas pressures acting in a direction transversely to the cylinder axis without presenting any local accumulation of material. In this zone of highest pressures and temperatures the new liners thus form simple, thin-walled tubes and they are mounted in the cooling jackets in such manner that at least this zone of highest heat stresses is outwardly in contact with cooling water practically everywhere. Preferably the points, at which the members (such as screw bolts or the like) hold the liner in place in the cylinder, are located outside of this zone. In engines formed with a cylinder head separate from and disengageably connected with the water jacket (this cylinder head extending either over one or a plurality of cylinders) it has been found advantageous to press the liner or liners directly against the cylinder head, since in this manner any unfavorable accumulation of material at the walls of the combustion chamber which are exposed to the highest temperatures, can be easily avoided. Preferably the liner is pressed against its seat on the cylinder head by means of elastically yielding members in such manner, that at all heat conditions of the engine a sufficient packing pressure is provided. The liner may for instance be pressed onto its seat by axially acting springs. It may however also be held down on its seat by screw bolts which extend from a point on the liner remote from the seat to a point of the cylinder head. The screw bolts thus become comparatively long and since they are only required to exert a low packing pressure, they may be very thin and consequently very elastic.

However since these new liners described in my copending application have the form of thin-walled tubes, care must be taken that the thin liners do not undergo any undesirable change of form under the action of the forces exerted upon them by the members serving to press them onto their seats in the engine cylinder.

In order to attain this, I provide, in accordance with the present invention, that the liner, while the inner surface is being machined, is pressed against the part of the lathe or other machine tool, in which it is mounted, by forces acting upon the same points of the liner and being approximately as great as the forces, which later on act towards pressing the liner onto its seat in the engine. Preferably I use for this purpose the same members (screw bolts, springs or the like) which serve to later on fix the liner in the engine cylinder, and these members are put to approximately the same tension in both cases.

In the drawing affixed to this specification and forming part thereof, the combination, with an engine cylinder, of a liner to be treated and the means for treating same in accordance with the present invention are illustrated diagrammatically by way of example.

In the drawing,

Fig. 1 is an axial section of part of a cylinder block of an internal combustion engine as disclosed in my copending application aforesaid, and Fig. 2 is a similar view of part of a cylinder body and liner, which illustrates, on a greatly exaggerated scale, changes of form arising in the liner, when machined in the hitherto usual manner, and which are avoided according to the present invention.

Fig. 3 shows a machine tool with a liner mounted thereon for machining,

Fig. 4 being a cross section of the liner and the grinding wheel on the line IV—IV in Fig. 3.

Referring first to Fig. 1, I is the water jacket of a block of cylinders, 2 is the cylinder head, which covers a plurality of cylinders and is formed with cavities 3 for the passage of cooling liquid. 4 are the liners which are seated in the cylinder head, the joint between the end face of the liner and its seat in the cylinder head being preferably packed by means of a ring 6 of elastic material (copper or the like). The liner 4 is pressed onto its seat in the cylinder head by means of long thin screw bolts 12, one end of each of which is fixed in one of the projections 13 formed on the liner remote from the seat 6, while their other ends are fixed in the outer wall of the cover 2.

Fig. 2 illustrates in a greatly exaggerated manner the deformation to which a liner machined in the usual manner on the lathe and mounted in the engine is subjected under the forces exerted thereon by the screw bolts 12. While the point of deformation, which is the point, where the projections 13 are formed on the liner, is spaced from the combustion chamber proper and is therefore not exposed to particularly high pressures or temperatures, in view of the low thickness of wall of the liner a deformation of this kind may still be injurious to the movement and tight fit of the piston. In order to altogether avoid such deformation, I prefer finishing the liners in the following manner: I fix the liner in position in an apparatus which corresponds to the cooling jacket of the cylinder of the engine and I fix it in place therein by the same means which later on serve to fix the liner in the cooling jacket, i. e. for instance by means of the longitudinally elastic screw bolts 12. If the liner is thus fixed in the machine tool in this manner, its points of fixation are subjected to the action of the same forces, which will later on act thereon in the engine. When using the long screw bolts, I can easily effect this by turning the nuts, after they have once been applied to their seats, through a number of revolutions, which has been predetermined by tests, this being done when mounting the liner in the machine tool and also later on, when mounting it in the engine.

Figs. 3 and 4 illustrate the mode of mounting the liner in the machine tool.

20 is the machine bed and 21 is the spindle support, 22 being the spindle arranged in the support for rotation, 23 being a stepped pulley for a driving belt. 24 and 25 are parts of a chuck mounted on the free spindle end and serving to fix the liner in position for machining. The part 24 of the chuck is formed with a depression 26 corresponding to the seat of the liner in the cylinder cover. The part 25 of the chuck is formed with a cylindrical boring 27 fitting around the flange 9 formed on the liner 4 and thus corresponding to the annular projection 10 of the water jacket shown in Fig. 1. By means of the thin stay bolts 12 fixed in the projections 13 of the liner and which extend through borings 28 in the part 24, being placed under tension by means of nuts 30, the liner is pressed onto its seat 26. The nuts 30 are screwed down on the bolts 12 in such manner as to force the liner onto the part 24 with the same force, which will later on press it against the seat in the cylinder cover.

Another support 35 mounted on the machine bed 20 for longitudinal displacement carries a cross slide 31, on which is mounted an electromotor 33, on the spindle of which is mounted the grinding wheel 32. By suitably adjusting the support 31, the thickness of the metal layer to be ground off, and by adjusting the support 35 the machining of the entire inner wall of the liner is provided for.

If this mode of fixation is adopted, the liner will be subjected in both cases to the same compression strain, and if its inner wall has been machined to its correct form under the action of these forces, it will retain the form imparted to it by the tool also after the liner has been finally mounted in the engine.

I wish it to be understood that I do not desire to be limited to the exact details of construction shown and described for obvious modifications will occur to a person skilled in the art.

I claim:—

The method of manufacturing liners, having the form of thin-walled tubes, designed to have one end pressed in axial direction by elastic means onto a seat in a cylinder of an internal combustion engine, which comprises mounting such liner in a machine tool with an end face applied against a seat in said tool, pressing said liner onto said seat by means of the same elastic means which are designed to press same onto its seat in the engine, said elastic means being here put to approximately the same tension as later on in the engine, and machining the liner thus mounted.

OTTO MADER.